United States Patent Office 2,847,316
Patented Aug. 12, 1958

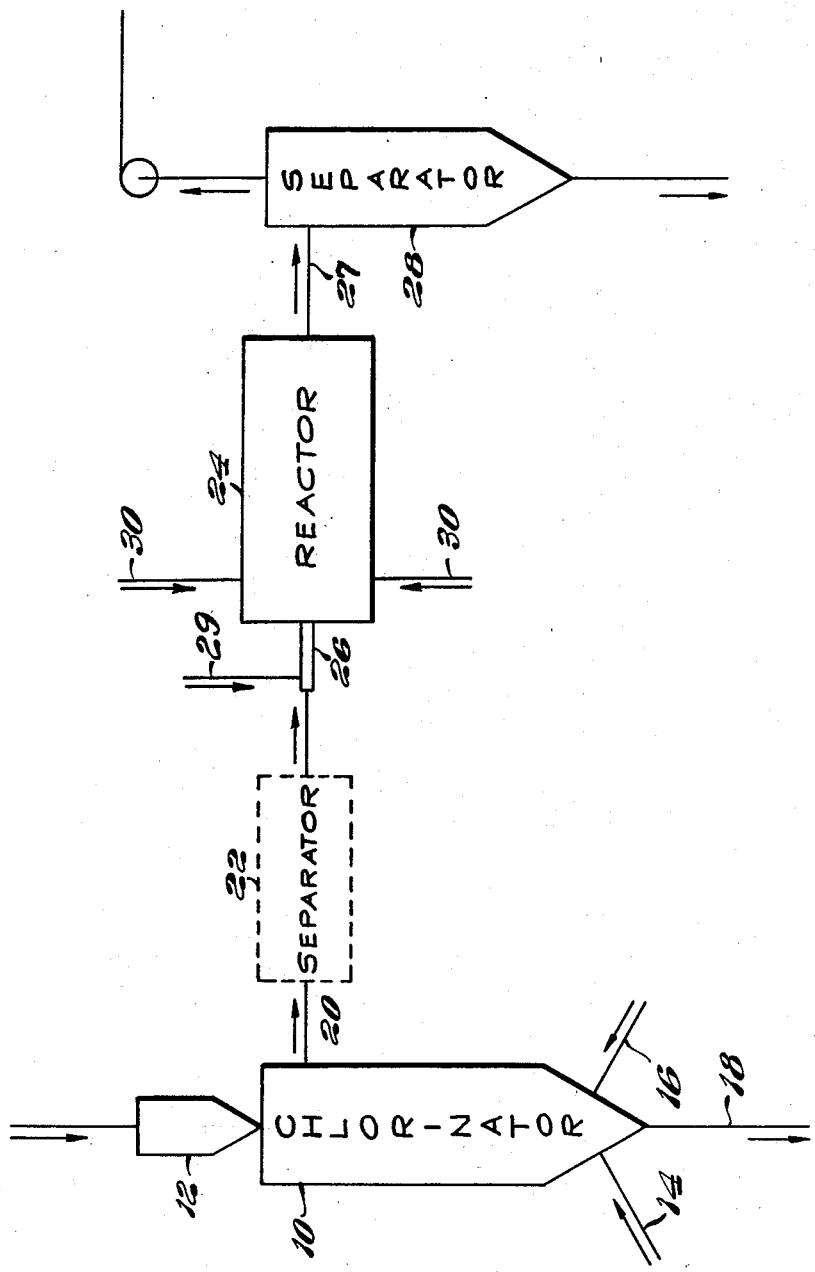

2,847,316

PROCESS FOR PRODUCTION OF MIXED METAL OXIDES

Laurent P. Michel, Watertown, and Thomas H. Goodgame, Ipswich, Mass., assignors to Godfrey L. Cabot, Inc., Boston, Mass., a corporation of Massachusetts Application September 29, 1954, Serial No. 459,014

8 Claims. (Cl. 106—288)

This invention relates to finely-divided mixed oxides of metals and metalloids which are exceptionally homogenous and uniform in character and chemical composition and to a novel process for their production whereby such oxides are formed together and coprecipitated as the solid products of a high temperature gas phase reaction. More particularly our invention is directed to an integrated process of producing mixed oxides consisting of silica and at least one other metal oxide in which very cheap and abundant metal-bearing silicious materials are utilized so efficiently that substantially all of their metal and silica content is reacted and appears in the finished product. The preferred compositions of this invention are mixed oxides in which the portion other than silica is composed predominantly of aluminum and/or zirconium oxides.

The utility of finely-divided metal oxides, including silica, which is often classed as a metal oxide by custom in many arts, has long been established. The principal uses of such oxides are as reinforcing fillers for elastomers and as pigments for protective coatings. Several million pounds of colloidal silica and alumina are consumed annually in these applications alone. These materials are, however, expensive to produce, particularly the oxides in the average particle size range below about 100 millimicrons. Their high cost is largely due to the necessity of using substantially pure compounds as the raw materials therefor. The product in each case is, of course, a substantially pure oxide of the corresponding metal.

It has been found that both elastomeric and coating compounds may be improved by the addition of two or more different metal oxides because of the synergistic effect created by such mixtures whether in extent of reinforcement of an elastomer or in extent of hiding or coloring power of a paint. But while the mechanical mixing of such pure oxides has achieved improved results it has not lowered costs of finished product appreciably.

We have discovered that coformed mixed oxides having properties fully equal to and in some cases superior to mechanical mixtures of pure separately produced oxides can be made by the single process of our invention involving a novel series of steps whereby cheap and abundant raw materials can be used directly without previous beneficiation or prior conversion to intermediate compounds. That we were able to produce in situ such mixed oxides of uniform composition in highly pure and homogeneous form from such materials was unexpected and surprising since all of the teaching of the prior art of which we are aware would lead one to believe that the oxides must be produced from pure metal halide compounds or at best from mixtures of such compounds.

It is the principal object of this invention to provide a novel process for producing finely-divided, substantially pure mixed metal oxides directly from the corresponding metal-containing ores.

Another object of this invention is to provide a novel mixed oxide composition of high purity and fineness of subdivision.

Another object of this invention is to provide a novel process for producing mixed oxides of silicon and at least one other metal, preferably aluminum and/or zirconium.

A further object is to provide a process for making such mixed oxides of uniform composition and character continuously from a starting material which is composed predominantly of crude ore or mineral matter. It is also an object to provide in such a process for the more efficient utilization of the silicon content of said raw material.

Another object is to provide a simple, integrated process for producing mixed metal oxides from ores of metals which, in the chloride state, show anomalous vapor pressure behavior.

Another object of this invention is to provide a process for producing a very finely-divided, high quality pigment filler having unique characteristics of outstanding value, particularly in plastics, elastomers and protective coatings.

According to the process of the invention, the selected metal-containing siliceous ore is mixed with carbon and reacted with chlorine gas under conditions of such intense reaction as to convert not only the metals contained in said ore but also the major part of the silica contained therein to the corresponding chlorides in gaseous admixture. Said admixed gaseous chlorides by contact with an oxygen-containing gas or vapor at elevated temperature are converted to oxides, which are then separated from the product gases as mixed oxides of uniform composition.

As we have said, the process of this invention is primarily adapted to the production of mixtures of silica with alumina and/or zirconia. Consequently, the preferred raw materials for the process are silicate minerals of the corresponding metals, such as clays, kaolins, bentonite, bauxite and other aluminous silicate minerals, all of which are abundant and cheap, as well as zircon, azorite, baddeleyite and related silicate minerals of zirconium. By means of our process, substantially the full oxide-forming capacity of such materials is utilized in the production of pigment and filler grade mixed oxides.

The outstanding economy of our process is realized largely through the highly efficient utilization of the oxide-forming capacity of the above cheap and readily available but highly impure raw materials. This is accomplished by conducting the chlorination of the ore very quickly under conditions of intense reaction created with the aid of a highly exothermic reaction conducted at the very site of most intimate contact between ore, carbon and chlorine gas. This not only has the advantage of avoiding the need for conducting heat through a reactor wall at high temperature levels and in the presence of gases which are highly reactive even to such inert materials as clay and other refractory compounds, but also achieves more complete reaction of ore, especially the silicon content thereof, than is possible with conventional chlorination techniques other than those involving the use of electrical energy as a source of heat.

Another important advantage of our process is that it avoids any necessity for phase transitions of chlorides of aluminum and zirconium, which, because of their anomolous vapor pressure behavior conventionally cause difficulties in processes for making flame-formed oxides from such chlorides in the vapor state.

The accompanying drawing, which is a flow diagram of the process of this invention, will serve to illustrate the invention when considered in connection with the following detailed description thereof.

The selected ore, which for the purposes of illustration may be assumed to be Georgia kaolin clay, is intimately mixed with carbon either outside or within heat-insulated chlorinator 10. If premixed by briquetting or pelletizing by any of the well-known methods the carbon-ore mixture may be charged to hopper 12 and delivered to chlorinator 10 through a suitable seal valve, or it may be conducted into the bottom of the chlorinator in reactant or inert gases through either or both of pipes 14 and 16. Alternatively, the carbon and ore may be separately introduced through different inlets into the chlorinator provided flow conditions are such as to provide intimate admixing of the two for reaction with chlorine gas as hereinafter described. The carbon constituent may be charcoal, coke, carbon black or any other material having a high free carbon content.

Chlorine gas is delivered to chlorinator 10 in any convenient manner to effect intimate contact with the carbon-ore mixture. Most conveniently it will be introduced into the bottom of the chlorinator and may serve as a fluidizing gas if a fluid system is employed. Air or oxygen may also be introduced into the chlorinator preferably at the bottom, and will sometimes be desirable as will be pointed out hereinafter. In such case, it may be premixed with the chlorine. Certain inert gases may be used to assist fluidization if desired provided such gases are free from moisture and provided such gases do not form water in the course of the reaction in the chlorinator.

At temperatures of over 1000° C. such as are required for a significant rate of reaction between $SiO_2$, C and $Cl_2$, the reaction equilibrium strongly favors the formation of CO (rather than $CO_2$). In this case, therefore, the following typical equations illustrate the major reactions:

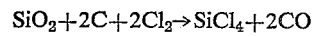

$$SiO_2 + 2C + 2Cl_2 \rightarrow SiCl_4 + 2CO$$

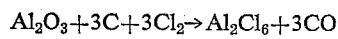

$$Al_2O_3 + 3C + 3Cl_2 \rightarrow Al_2Cl_6 + 3CO$$

Such reactions are not strongly exothermic and, therefore, are self-sustaining only if all heat losses are avoided and all reactants are strongly preheated, neither of which conditions can be realized easily in practice. In the present process the required temperatures of 1000° C. or higher, preferably about 1000°–1200° C., are most advantageously attained within the chlorinator 10 and the recovery of a major part of the silica content of the crude ore is achieved by use of an auxiliary reaction which is conducted immediately at the site of reaction between chlorine, carbon and ore. For this purpose, it is preferred that one of the reactants in said auxiliary reaction be a solid which is in intimate admixture with said ore. Suitable solid reactants include free metals and metalloids, their carbides or nitrides, metal silicides and mixtures of any of these. It is also preferred that the auxiliary reaction be one in which little or no water vapor is produced. If carbon is used as the heat generating solid reactant, oxygen should be included in the reactant gases supplied to chlorinator 10 and, for maximum utilization of the ore, the amount of carbon supplied to the chlorinator should be in excess of that stoichiometrically required for reaction with all metal and metalloid oxides in said ore in accordance with the above typical equations. The remaining solid reactants mentioned above all react in a strongly exothermic manner with chlorine and additional chlorine may readily be supplied for such reaction. In addition to the available variations in the composition of the ore or ore mixture, additional control over the proportions of silicon, aluminum, and/or zirconium chlorides in the vaporous product stream from the chlorinator 10 (and, therefore, also over the composition of the mixed oxides eventually produced) can be had through selection of particular additive solid reactants other than carbon, i. e. those which react with the chlorine to form volatile chlorides.

As pointed out above, moisture is undesirable in chlorinator 10, as is hydrogen also, especially when oxygen gas is introduced. For this reason, the use of a hydrogen-containing auxiliary fuel is prohibited, and it is preferred that all reactants be dry, or be dried or calcined before being fed to the chlorinator. In this connection it is most convenient to calcine all the solid reactants (whether premixed or preformed into briquettes, pellets or other aggregates or not) just prior to introducing them to the chlorinator 10. In this way most economical use can be made of the sensible heat content acquired by said solids during calcination. It is preferred that the bulk of the solids be preheated to at least about 500° C. before being charged to the chlorinator 10 in order to minimize the amounts of auxiliary solid reactants which must be added.

The chlorination reaction is preferably conducted continuously under the conditions outlined above, with the unchlorinated residue or ash being discharged through a bottom outlet 18 and the chloride vapor containing product stream being withdrawn through an outlet 20 near the top of chlorinator 10. The chloride vapors in said product stream will consist, in the main, of chlorides of silicon and aluminum and/or zirconium. There will also usually be present small amounts of other metal chlorides as impurities, particularly titanium tetrachloride and ferric chloride, and possibly very small amounts of others such as beryllium chloride and rare earth metal chlorides. The product stream from the chlorinator will also contain certain permanent gases especially carbon monoxide, carbon dioxide, and often nitrogen as well, or, in small quantities, such unreacted elements as $O_2$ and $Cl_2$, etc.

Of the various possible impurities and by-products in this chloride vapor product stream only the iron chloride is likely to be undesirable in the subsequent reaction of the chloride vapors in an oxide-producing flame. This impurity can readily be removed if desired without loss of other solid oxide producing components and without the necessity of separating or rehandling any of the other chlorides. For example, the removal of the iron component may be accomplished by passing the chloride vapor product stream at a temperature of less than about 500° C. over or through a bed of iron metal having a high surface area exposed, e. g., steel wool or iron filings, etc. This will reduce the iron chloride to the relatively nonvolatile ferrous form. Since the temperature of the chloride vapor product stream leaving the chlorinator will generally be around 800° C. or more, it will ordinarily be necessary to allow the stream to cool somewhat before purification in iron separator 22. However, in the interests of heat economy in the overall process the removal of iron, if practiced, should be conducted at the highest allowable temperature, temperatures of about 300 to 500° C. being preferred. In any case the temperature of the chloride vapor stream leaving the separator should not be less than about 200° C., and not less than about 300° C. if major amounts of zirconium tetrachloride are present.

Other methods of iron removal may also be practiced, particularly if zirconium tetrachloride is not a major ingredient of the chloride product stream, for example, by fractional condensation or by absorption in molten chloride salts. Thus, the iron chloride receptor material may be iron filings or molten sodium chloride and ferric chloride mixtures which may be circulated through separator 22 in conventional manner.

Such treatments of the chloride vapor product stream to remove iron will also serve the beneficial purpose of filtering out any solid grit or dust entrained and carried over from the chlorinator by the vapor product stream. An inert fibrous filter such as an asbestos filter can be used for this purpose even if iron chloride removal is not practiced. Consequently, though separator 22 may be optional equipment it will be employed in the preferred practice of this invention.

The chloride vapor product stream from the separator 22, or from the chlorinator 10 if iron chloride removal is not practiced, is conducted to reactor 24 for high temperature conversion of the metal chlorides to a mixed oxide product. The oxide producing step involves the high temperature reaction under conditions of high turbulence of the said chloride vapors with an oxygen-containing gas, which may be either free-oxygen, a free-oxygen containing gas such as air, or water vapor. The temperature in the reactor 24 should be at least about 500° C. and preferably between about 600 and 1000° C., although it may be as high as about 1200° C.

The chloride vapor product stream entering reactor 24 will generally be quite hot over a wide range from about 200° C. to about 1000° C. depending upon the directness of its path from the chlorinator 10 to the reactor 24. However, even if the inlet temperature is below 500° C., said chloride vapor product stream will always contain appreciable quantities of carbon monoxide which can be conveniently burned in reactor 24 to supply additional heat for the oxide-forming reaction.

In the preferred form of reactor, the chloride vapor stream is injected in a generally downstream direction into one end of reactor 24 through an axially located injector 26. The reactant gases which may contain free oxygen, water vapor or both may conveniently be injected around the chloride vapor stream in a reasonably symmetrical pattern through a concentric pipe surrounding the chloride injector and supplied by pipe 29. Or a combustible mixture of a hydrogen-containing gas, or superheated steam may be injected tangentially into the reactor adjacent the inlet end, being supplied by pipes 30. If water vapor is admitted with the reactant gases, as is preferred, the heat required for vaporization of the water can conveniently be obtained by heat interchange with the reactor 24 or with reactor outlet flue 27.

The water vapor and/or oxygen fed to reactor 24 should ordinarily be supplied in considerable excess, e. g., at least 25% and preferably 50 to 100% in excess, of that stoichiometrically required for complete reaction of the chloride vapors and combustible gases present. However, all of the CO need not be burned especially if doing this would produce a temperature higher than desired. However, if sufficient oxygen for complete combustion of the CO is not provided it is more dependable to rely on reaction with water vapor rather than with free oxygen for conversion of the chlorides to mixed oxides.

The high temperature reaction in reactor 24 will produce an aerosol containing very fine solid particles of mixed oxides. For best results, this mixed oxide product should be separated from the by-product gases and vapors in which it is suspended quickly and at a temperature at least sufficiently high to avoid condensation of water vapor, or HCl, etc. To achieve separation the reaction products are conducted to a suitable collection system which, as illustrated may consist of a cyclone separator 28. Alternately the collection system may comprise a series of cyclones, or other devices such as bag filters, ceramic filters, electrostatic or ultrasonic precipitators either alone or in conjunction with each other or with cyclone separators. Depending upon the type of collection system used and the temperature of the product stream from the reactor it may be necessary to cool the reaction products somewhat before recovering the mixed oxide product. For example, some of the heat content of these reaction products can be used advantageously to generate steam for reaction with the chlorides. Regardless of how the reaction products are cooled, however, it is important that the fine particles of mixed oxide be separated from the gaseous components at a temperature of at least about 100° C. and preferably above about 200° C.

Many other modifications and additions to our process, as practived in the manner schematically illustrated by the drawing are, of course, possible, as will be clear to those skilled in the art. For example, the mixed oxide product can be after-treated in various ways, such as by roasting, in order to vary its color, pH, gas content, surface activity, etc.

The mixed oxide product of the above process is an exceptionally valuable pigment and remarkably active reinforcing filler for all types of elastomers, rubbers, etc. Although much cheaper and easier to produce than finely-divided pure oxides of straight silicon, aluminum or zirconium, the mixed oxides of our invention give in general equally good results and for many purposes, such as certain applications in silicone or butyl rubber, show a more useful combination of properties and characteristics than any one of the pure oxides alone. Moreover, they are decidedly more uniform and perform more dependably than any mechanical mixture of the various pure oxides. The particle size of the mixed oxide product of the above process averages about 10–100 millimicrons depending upon the conditions of formation. Thus, the higher the temperature and the more dilute the concentration of the solid oxide-forming chlorides in the oxide-forming reaction mixture, the finer the resulting particles tend to be.

The following examples illustrate in more detail the operation of our novel process to produce specific products.

*Example 1*

1000 lbs. of raw Georgia kaolin clay analyzing by weight about 44 $SiO_2$, about 38% $Al_2O_3$ and containing about 1.2 to 1.5% $Fe_2O_3$ and 1.5 to 2.0% $TiO_2$ as mined is mixed thoroughly with 350 lbs. of powdered coke and 100 lbs. of pitch. By forming the resultant semi-plastic aggregate and calcining it in the absence of air to remove moisture and carbonize the pitch, 1250 lbs. of porous agglomerates or briquettes are produced, containing about 411 lbs. of carbon.

These briquettes are fed at a rate of about 100 lbs./hr. into the top of the chlorinator, which they enter at a temperature of about 500° C., while a dry gas stream containing both chlorine and oxygen is fed into the bottom thereof. The gases fed include about 2 mols./hr. of chlorine (700 cu. ft./hr. SCTP) and almost 1 mol/hr. of oxygen (i. e., about 1500 cu. ft./hr. of air SCTP) and they enter the chlorinator at a temperature of about 300° C., being heated to this temperature after start up is effected by indirect heat interchange with gaseous reaction products leaving the chlorinator at the top. The reaction of the oxygen gas with the excess carbon in the briquettes provides temperatures in the neighborhood 1000° C. within the pores, causing rapid chlorination of the silicon as well as of the aluminum, and the iron and titanium impurities. The crude chloride product vapor stream leaving the top of the chlorinator has a temperature of about 800° C. and contains by volume about 7% $SiCl_4$ about 4.5% $Al_2Cl_6$ and about 0.1% $Fe_2Cl_6$ and 0.3% $TiCl_4$. It also contains about 26% CO, 12% $CO_2$ and 43% $N_2$.

After partial cooling the crude chloride product vapor stream enters the iron separation chamber at a temperature of about 500° C. In this chamber, the ferric chloride is converted to ferrous chloride and filtered out as the vapors pass through a bed of steel wool. The iron-free chloride vapor stream at a temperature of about 400° C. is then injected axially into a cylindrical reaction chamber of about 5″ inside diameter at a steady feed rate equal to that at which vapors are being produced in the chlorinator, or about 2500 cu. ft./hr. (SCTP). Simultaneously, about 3000 cu. ft./hr. (SCTP) of air (almost 100% excess over that required for combustion of all the CO in the chloride vapor stream) is injected in a generally downstream direction through an annular passage located immediately around the central injector pipe through which the chloride vapor stream enters. Also, at the same time about 1500 cu. ft./hr. (SCTP) of superheated steam at a temperature of about 300° C. is injected tangentially into the cylindrical reactor from multiple orifices located just a few inches downstream from the end of the chamber through which the chloride vapor and air are injected. This amount of water vapor is about 200% of that stoichiometrically required for hydrolyzing all of the chloride vapors to oxides.

In the ensuing reactions within the cylindrical chamber, a temperature of about 800° C. is reached and a dilute aerosol of very fine particles of solid mixed oxide is formed. This aerosol product stream from the reactor is cooled to about 400° C. with the heat extracted being used to generate water vapor for use in the oxide-forming reaction. The finely divided mixed oxides are then recovered by passing the aerosol product stream through a collection system consisting of a number of cyclones in series followed by a bag filter. The solid mixed oxide product, consists of a fluffy white powder with an average particle size of about 25 millimicrons and analyzing about 46% by weight $SiO_2$ and about 51% by weight $Al_2O_3$. This mixed oxide can be used at a loading of 50 parts per hundred parts of silicone polymer to produce a silicone rubber of outstanding strength, resiliency and tear resistance with no difficulties in incoporation, processing or curing.

In the above example there can be substituted for the 1000 lbs. of Georgia kaolin 1000 lbs. of Colorado bentonite, analyzing by weight about 51% $SiO_2$, 21% $Al_2O_3$ and about 8% $Fe_2O_3$, except that the 1 mol/hr. of oxygen is supplied to the chlorinator as straight oxygen (350 cu. ft./hr. SCTP) rather than as air. The resulting product analyzes about 65% $SiO_2$ and about 34% $Al_2O_3$ by weight.

*Example II*

1000 lbs. of low grade Arkansas bauxite analyzing by weight about 45% $Al_2O_3$ and containing about 15% $SiO_2$, about 9% $Fe_2O_3$ and about 5% $TiO_2$ is intimately mixed with 200 lbs. of powdered coke, 200 lbs. of crushed silicon carbide and 100 lbs. of pitch. The resultant mixture is formed into briquettes and calcined in the absence of air. 1200 lbs. of briquettes are obtained containing 250 lbs. of carbon. These briquettes are fed at the rate of 100 lbs./hr. to a chlorinator in the manner described in Example 1. However, the only gas fed to the bottom of the kiln in this case is about 2.5 mols/hr. (900 cut. ft./hr. SCTP) of $Cl_2$, at a temperature of about 100° C. The reaction of the SiC with the $Cl_2$ raises the internal temperature of the briquettes to around 1000° C. and effects reaction between the bauxite and the chlorine as well. The crude chloride vapor stream produced contains by volume about 16% $SiCl_4$, 10% $Al_2Cl_6$, 1.3% $Fe_2Cl_6$ and 1.5% $TiCl_4$ with substantially all of the remainder being CO.

This crude chloride vapor stream as produced at a rate of about 1300 cu. ft./hr. (SCTP) is injected directly at a temperature of about 700° C., into an oxide-forming reaction zone together with 1500 cu. ft./hr. (SCTP) of water vapor at a temperature of about 200° C. and about 1500 cu. ft./hr. (SCTP) of air at a temperature of about 400° C. The resultant aerosol of finely divided mixed oxides suspended in 1000° C. gases is recovered as in Example 1. The finished product is a fluffy rose colored powder with an average particle size of about 40 millimicrons and analyzes about 45% $Al_2O_3$ and about 41% $SiO_2$ by weight.

In the above example there can be substituted for the 1000 lbs,. of bauxite 1000 lbs. of zircon concentrate analyzing by weight about 57% $ZrO_2$, 23% $SiO_2$, 10% $TiO_2$ and about 2% $Fe_2O_3$, except that in this case about 1375 lbs. of briquettes are produced. The resulting product analyzes by weight about 47% $SiO_2$, about 42% $ZrO_2$ and about 8% $TiO_2$. Other materials which can be used in place of SiC to give strongly exothermic reaction with $Cl_2$ include free silicon, free zirconium, free aluminum, aluminum silicide, zirconium silicide and the carbides and nitrides of silicon, aluminum and zirconium.

The scope of the present invention is not to be limited by the above examples, which are given for illustrative purposes only, but only by the appended claims.

We claim:

1. A process for producing finely-divided mixed metal oxides, comprising forming a reactive bed by intermingling a crude siliceous ore of a metal selected from the group consisting of aluminum and zirconium with at least sufficient carbon for stoichiometric reaction with the total oxide content thereof and a solid metallic material which reacts strongly exothermically with chlorine, reacting the intermingled ore, carbon, and solid metallic material with free-chlorine-containing gas at a temperature of about 1000° C. generated within the bed by the reaction of the chlorine with the solid metallic material thereby converting much of the silicon as well as the other metals in the ore to the corresponding metal chlorides in homogeneous vaporous admixture, contacting said vaporous mixed metal chlorides with an oxygen-containing gas at elevated temperature, thereby converting them to the corresponding mixed metal oxides in the form of ultra-fine solid particles of uniform composition in gaseous suspension and recovering the finely-divided mixed metal oxides thus produced from the other reaction products.

2. The process of claim 1 in which the strongly exothermically reacting material is selected from the group consisting of free silicon, free aluminum, free zirconium, silicon carbide, silicon nitride, aluminum carbide, aluminum nitride, aluminum silicide, zirconium carbide, zirconium nitride, zirconium silicide and mixtures thereof.

3. A process for producing finely-divided mixed metal oxides which comprises the steps of mixing a crude siliceous ore of a metal selected from the group consisting of aluminum and zirconium with at least sufficient carbon for stoichiometric reaction with the oxygen content thereof and with an unoxidized solid metallic material which reacts strongly exothermically with chlorine, conducting said mixture to a chlorination zone, flowing free-chlorine-containing gas in contact with said mixture, thereby converting much of the silicon and the other metals in said mixture to a homogeneous mixture of gaseous metal chlorides and producing sufficient heat to maintain said temperature of at least 1000° C., conducting the gaseous metal chlorides to a heated oxidation zone, contacting said gaseous metal chlorides with an oxygen-containing gas at elevated temperature, thereby converting the gaseous mixture of metal chlorides to finely-divided solid mixed metal oxides of uniform composition suspended in gaseous reaction products, and recovering the finely-divided mixed oxides from the gases.

4. The process of claim 3 further characterized by mixing with the crude siliceous ore more than sufficient carbon for stoichiometric reaction with the oxygen content thereof and conducting to said chlorination zone air in an amount at least equal to that stoichiometrically required for reaction with the carbon in excess of that required for reaction with the oxygen content of said ore.

5. The process of claim 3 in which the strongly exothermically reacting solid material is selected from the group consisting of free silicon, free aluminum, free zirconium, silicon carbide, aluminum carbide, zirconium carbide, silicon nitride, aluminum nitride, zirconium nitride, aluminum silicide, zirconium silicide and mixtures thereof.

6. The process of claim 3 in which the oxygen-containing gas with which said gaseous metal chlorides are contacted is water vapor.

7. The process of claim 3 in which the oxygen containing gas with which said gaseous metal chlorides are contacted is free oxygen.

8. The process of claim 3 in which the maximum temperature which is maintained within the chlorination zone is not less than 1200° C.

References Cited in the file of this patent

UNITED STATES PATENTS

| | | | |
|---|---|---|---|
| 1,875,105 | Muggleton et al. | | Aug. 30, 1932 |
| 2,141,444 | Nordberg | | Dec. 27, 1938 |
| 2,347,496 | Mushat et al. | | Apr. 25, 1944 |
| 2,437,171 | Pechukas | | Mar. 2, 1948 |
| 2,441,447 | Seabright | | May 11, 1948 |
| 2,446,221 | Ferguson | | Aug. 3, 1948 |
| 2,504,357 | Swallen | | Apr. 18, 1950 |